S. AUER.
MEASURING INSTRUMENT.
APPLICATION FILED FEB. 23, 1918.
1,291,711.
Patented Jan. 21, 1919.
2 SHEETS—SHEET 2.
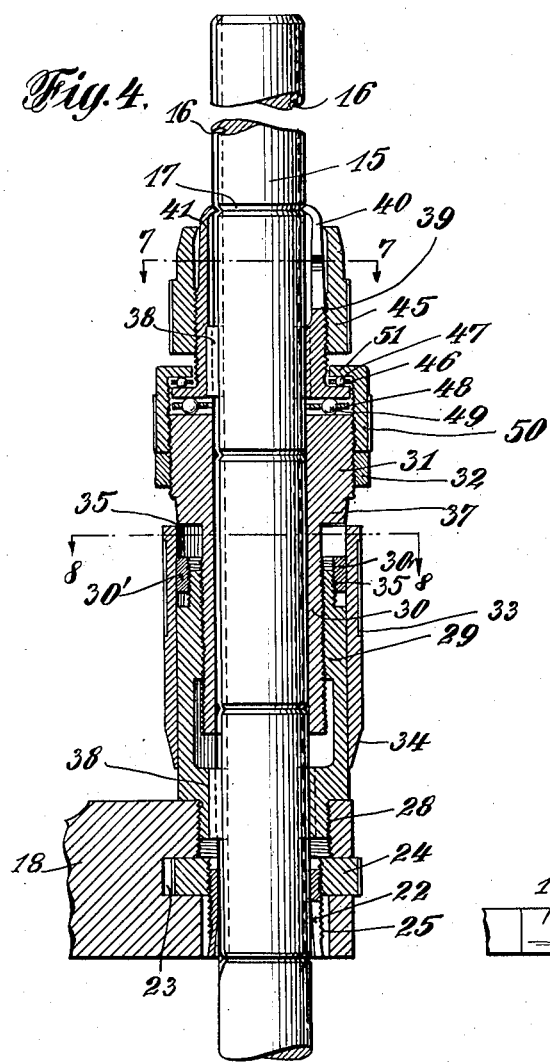
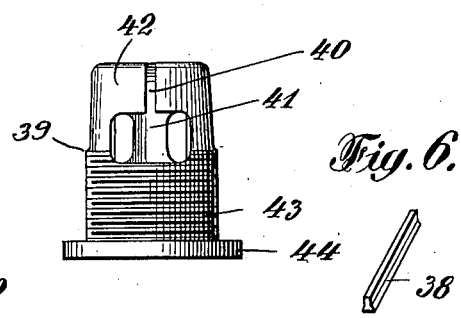
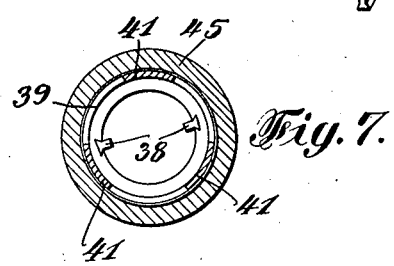
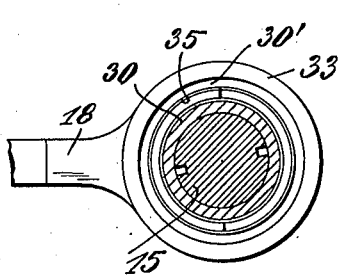
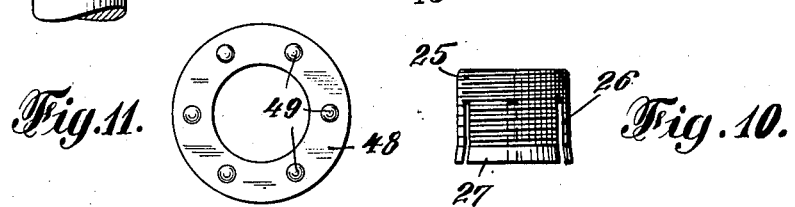
INVENTOR.
Simon Auer
BY
his ATTORNEY

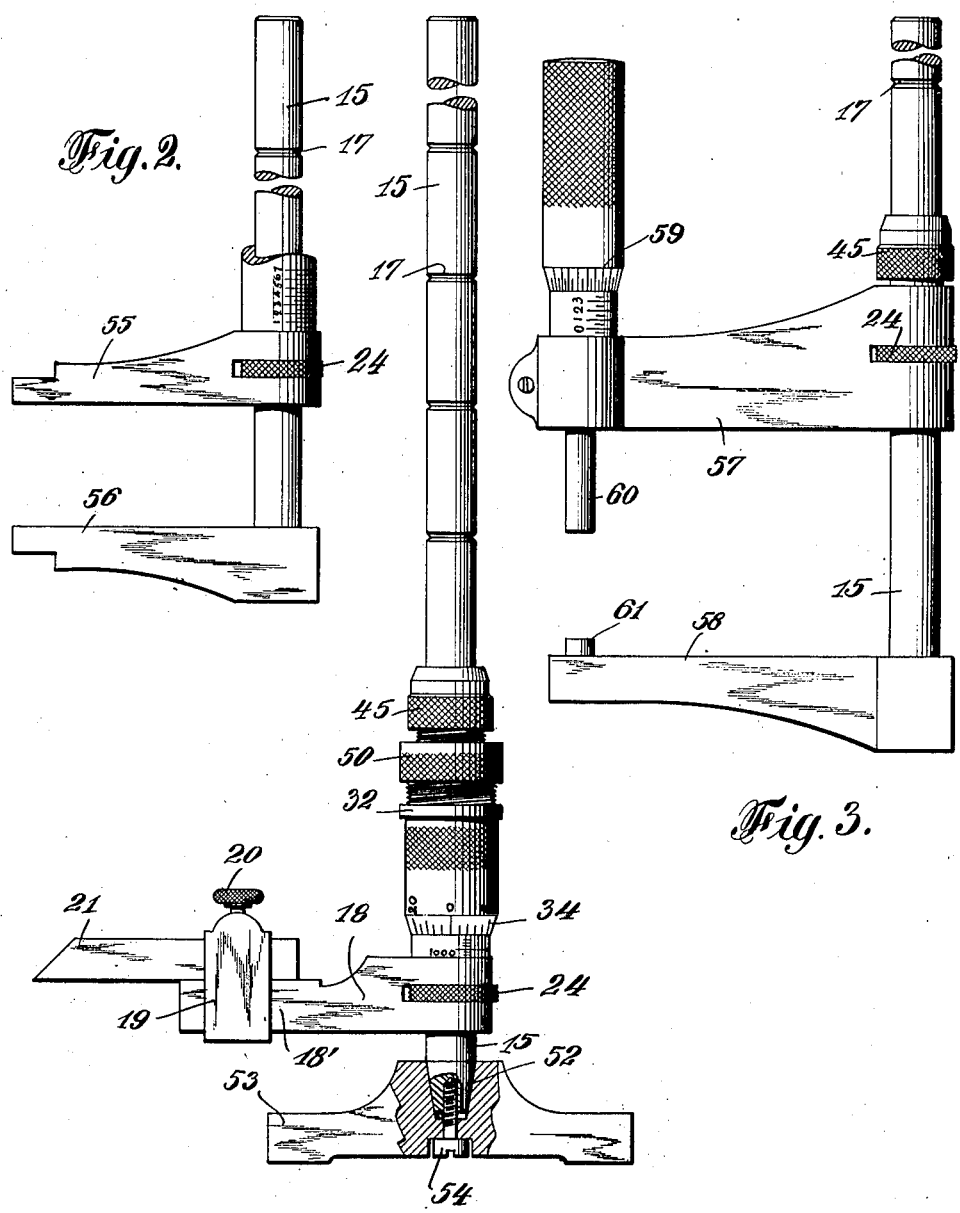

UNITED STATES PATENT OFFICE.

SIMON AUER, OF NEW YORK, N. Y.

MEASURING INSTRUMENT.

1,291,711.

Specification of Letters Patent. Patented Jan. 21, 1919.

Application filed February 23, 1918. Serial No. 218,890.

*To all whom it may concern:*

Be it known that I, SIMON AUER, a citizen of the United States, residing at New York, in the county of New York and State of New York, have invented new and useful Improvements in Measuring Instruments, of which the following is a specification.

This invention relates to measuring instruments, and the main object of the same is the provision of a measuring instrument, which in general terms may be referred to as a micrometer caliper, and which is adapted to be used by mechanics and others for measuring the dimensions of articles under manufacture or being worked upon, and for measuring distances thereon as well.

Another object of the invention is the provision of a measuring instrument of this character having its working parts so arranged that different types of measuring tools or calipers may be employed in connection therewith and as may be necessary to effect the measurements with ease and convenience, the particular combination of tools to be employed in any instance depending upon the form or configuration of the article or surface to be measured.

Another object of the invention is the provision of a high gage micrometer caliper, which is simple in construction, comparatively inexpensive to manufacture, easy to assemble, convenient to use, and which is capable of effecting measurements by inch units and by fractional portions to the fineness of one thousandths thereof.

With the foregoing and other objects in view, the invention resides in the details of construction and in the arrangement and combination of parts hereinafter described and shown in the accompanying drawings, forming a material part of this specification and in which:—

Figure 1 is a view in elevation of my improved measuring instrument, parts being shown broken away, the invention here being shown equipped with elements adapted more particularly for use in laying out and in inspecting work.

Fig. 2 is a view in elevation of a fragmental portion of the device, which is here shown equipped with elements adapted more particularly for effecting outside and inside measurements of curved articles.

Fig. 3 is a similar view, but showing the device equipped with a type of micrometer head suitable for adjusting the measuring calipers.

Fig. 4 is a longitudinal cross sectional view through the working parts, illustrating in particular how the same are assembled for operation upon their shaft.

Fig. 5 is an enlarged view in elevation of the spring locking collar for engaging the inch spaced recesses.

Fig. 6 is an enlarged view in perspective of the type of locking key employed.

Fig. 7 is a cross sectional view taken approximately on the line 7—7 of Fig. 4.

Fig. 8 is a cross sectional view taken approximately on the line 8—8 of Fig. 4.

Fig. 9 shows an end view of the anti-friction devices.

Fig. 10 is an enlarged view in elevation of the spring gripping collar for locking the parts on the shaft in the position desired.

Fig. 11 shows a plan view of the anti-friction devices.

With more particular reference to the accompanying drawings, the numeral 15 is employed to denote a steel shaft, which is provided upon its periphery with two equispaced longitudinal recesses or channels as 16 and at inch spaces with the annular channels or recesses as 17, the purposes of which will be hereinafter made manifest.

Removably mounted upon this shaft (Fig. 1) is a frame element 18, the projecting end portion 18' of which is fashioned to support in the usual way by means of a hanger coupling 19 and an adjusting screw 20, or any other suitable means, the movable finger 21. The opposite end of the frame 18 is enlarged as may be necessary to provide a vertical opening 22 (Fig. 4) of larger diameter than the shaft 15; and also with a horizontal intersecting midway opening 23, in which is seated a knurled thumb ring 24 also mounted upon the said shaft, the opening in this ring being smaller in diameter than the said opening 22, and the inner periphery of the same being screw-threaded for engagement with the coöperating screw-threads upon the spring gripping collar 25, which is formed with a plurality of spaced-apart slots 26 (Fig. 10) in order to provide spring fingers as 27 whereby, accordingly as the thumb ring 24 is rotated, to cause the spring fingers 27 to grip tightly or slidably release the shaft 15 either in the annular channels 17 or in any position desired upon the surface of the shaft. Above the thumb-ring 24, the wall of the opening 23 is screw-threaded to receive the coöperating threads provided on the reduced end 28 of the graduated scale sleeve 29, the upper end of which is screw-threaded upon the micrometer screw 30 slidably fitted upon the shaft 15. Preferably, in order to make suitale provision for the adjustment, under wear, of the screw-threaded connection between the sleeve 29 and screw 30, the upper reduced end of the former is split longitudinally (Fig. 8) for a distance, in which event a locking ring 30' is applied to the same for effecting the adjustment required. The upper end of the micrometer screw 30 is formed with an integral and screw-threaded head 31, upon which is threaded a locking ring 32 for a purpose as will presently appear.

Rotatably mounted upon the sleeve 29 is a thimble 33 formed with its lower end beveled at 34 to meet the said sleeve, and formed thereat with a graduated scale. The upper end of this thimble makes tight frictional engagement with the reduced lower end 35 of the screw head 31, which is slightly beveled inwardly for the purpose, although other suitable means for detachably effecting this connection may be employed. This whole arrangement is such that the micrometer screw 30 is made to rotate in accordance with the rotation of the thimble 33 with the result that the sleeve 29 and consequently the frame 18 is forced to slide longitudinally upon the shaft either toward or away from the lower end thereof. To lock the sleeve 29 and consequently the frame 18 against rotation with the screw 30, and yet to permit the same to slide upon the shaft, the inner periphery of the lower end 28 of the sleeve is provided with inset keys as 38, which project into the longitudinal slots 16.

Slidably mounted upon the shaft 15 above the micrometer screw 30, more particularly above the head 31 thereof, is a spring collar 39, formed preferably, as best illustrated in Figs. 5 and 7, with a plurality of longitudinal slots 40 communicating with relatively wide horizontal openings 41 in such manner as to produce spring fingers as 42, adapted when pressed together to engage an annular inch recess as 17. This spring collar is provided with a screw thread portion 43, and terminates in an annular flange 44. To prevent the spring collar from rotating and yet to permit its movement longitudinally on the shaft 15 when desired, there is inset on its inner periphery, as in the previous instance, keys as 38 which project into the longitudinal recesses 16. Threaded upon the spring collar 39 is a knurled lock nut 45, the manipulation of which produces in an obvious manner, the engagement or disengagement of the spring fingers 42 with an annular recess as 17. In this manner I provide a spring collar device, slidable but non-rotatable upon the shaft 15, which is adapted rigidly to be clamped in any of the inch recesses 17.

We now come to the means for connecting the micrometer screw 30 and the spring collar 39 so that the former will be held coupled with the latter, and adapted to be rotated with a minimum of fraction. To accomplish this, I mount around the spring collar just behind the flange 44 thereof, a ring plate 46 in which is set a plurality of antifriction balls 47, of which there are preferably six, the periphery of the balls extending beyond the flat sides of the ring on each side thereof, as shown in Fig. 4. Mounted around the shaft 15 between the lower end of the spring collar and the top end of the micrometer screw head, is another and larger flat ring 48 equipped with anti-friction balls as 49. Threaded upon the said head 31 is a knurled bearing clamping nut 50, the upper end of which is formed with an integral inwardly projecting flange 51, which engages the anti-friction balls 47 of the ring plate 46. The clamping nut 50 is locked with the head 31 so as to turn therewith by screwing the locking ring 32 tightly against it.

From the foregoing description, taken in connection with the accompanying drawings, it will be obvious that when the fingers of collar 39 are locked in an inch recess 17, and when the thumb ring 24 has been manipulated so as to permit the frame 18 to move longitudinally upon the shaft, the rotation of the thimble 33 will cause the said frame 18 to move upon the shaft toward or away from the lower end thereof, accordingly as the said thimble 33 is manipulated.

The lower portion of the sleeve 29 is provided upon its face with a guaduated scale reading toward the frame 18 from zero to one thousand, the same representing divisions of an inch; and the beveled edge of the thimble 33 is also graduated with 25 divisions, the same representing thousandths of an inch. As is customary with micrometer calipers, the pitch of the screw threads on the screw 30 is preferably one-fortieth, so that four turns of the thimble 33 register one-tenth of an inch or a one-hundredth division, while a turn of the thimble for a distance equal to the space between one division and another of the scale thereon registers one-thousandth of an inch.

With my improved measuring device may be employed various types of caliper parts, it being necessary, of course, that the various parts which are to be interchanged or substituted, shall be of standard form for proper application to the shaft 15. To this en' the lower end of shaft 15, in the present embodiment of the invention, is beveled toward a point, as at 52, which is adapted to be inserted in a suitable standard opening provided in the part to be applied as a base-plate or shoe 53. A screw as 54 threaded upwardly and centrally through the base-plate and also into the end of the said shaft 15 is preferably employed as appropriate means for removably securing the parts together. To mechanics and others skilled in the use of tools of this type, it will be obvious that the base-plate 53 is employed preferably when the instrument is to be stood upright for making laying-out measurements, for inspection work, and the like.

When inside and outside measurements of circular forms are to be made, caliper parts as 55 and 56, as shown in Fig. 2, may be substituted for the parts 18 and 53. Again, other caliper parts as 57 and 58 may be substituted when the nature of the work to be performed requires it, the part 57 being equipped with any suitable micrometer head as 59, for the proper adjustment of the movable spindle 60, the other part 58 being provided with the usual anvil as 61.

Having thus described my invention, what I claim is:—

1. In combination, a shaft provided with longitudinal recesses and inch spaced annular recesses, a frame element removably mounted thereon, mechanism engaged with the frame element to lock and unlock the same on the shaft, a graduated sleeve slidably mounted on said shaft and keyed in said longitudinal recesses against rotation, said sleeve being adapted to be engaged with said frame element, a screw element loosely fitted on said shaft and threaded partly within said sleeve, said screw element having an enlarged head beyond the end of said sleeve, a graduated thimble loosely mounted on said sleeve and engaged with said screw head in such manner that the rotation of the thimble will produce correspondent rotation of the screw, an inch setting spring collar slidably mounted on the shaft above the screw head and keyed in the longitudinal recesses against rotation, means combined with said spring collar to engage and disengage the same with any of the annular recesses as desired, means combined with anti-friction devices for positively connecting said screw head with said collar in such manner that the screw may be rotated freely, and caliper elements detachably secured one to said frame and one to said shaft.

2. In a measuring instrument, a shaft formed with equi-spaced longitudinal recesses and inch-spaced annular recesses, fixed and movable caliper elements detachably carried by the shaft, a sleeve having a graduated portion mounted on said shaft in engagement with the movable caliper element and keyed in said longitudinal recesses against rotary movement, said sleeve being formed at its lower end for rigid engagement with one of the caliper elements, a screw rotatably mounted on the shaft and threaded partly upon the interior of said sleeve, said screw being formed with an enlarged head at its upper end, a graduated thimble rotatably mounted on said sleeve and connected with said screw head so that any movement of the thimble will produce a corresponding movement of said screw for advancing and retracting said sleeve upon the shaft, a collar mounted upon the shaft above said screw head and keyed in said longitudinal recesses, said collar being formed with spring tongues adapted to engage said collar to operate upon said spring tongues, and means combined with anti-friction devices for connecting said screw head with said collar whereby to allow the free rotation of said screw.

3. In a measuring instrument, the combination with a shaft having equi-spaced longitudinal recesses and inch spaced annular recesses, and fixed and movable caliper elements detachably carried thereby, of a graduated sleeve detachably connected with said movable element keyed in said longitudinal recesses to maintain itself together with said movable element against rotary movement, said sleeve upwardly extending from the movable element and provided with an internally threaded portion, a screw element mounted upon the shaft and threaded partly within said sleeve and formed thereabove with a head, a graduated thimble loosely mounted upon the sleeve and engaged with said screw head whereby to turn said screw with the turning movement of said thimble, an inch setting collar slidably mounted on said shaft above said head and keyed in said longitudinal recesses against rotary movement, said collar being formed with spring tongues and an annular flange, anti-friction means engaged between said collar flange and said screw head, other anti-friction means mounted over said collar flange, and a bearing nut connected with said screw head bearing against said last anti-friction means to allow the free rotation of said screw, and locking means combined with said spring collar to operate upon the spring tongues thereof whereby at will to produce the engagement and disengagement of the same with said inch spaced recesses.

4. In a measuring instrument, a shaft provided on its periphery with anti-spaced longitudinal recesses and inch spaced annular recesses, fixed and movable caliper elements detachably carried by the shaft, a graduated sleeve mounted upon said shaft in engagement with the movable caliper element and keyed in said longitudinal recesses, a screw rotatably mounted upon said shaft with a portion threaded in the upper interior of said sleeve, said screw having an upwardly extending head exteriorly threaded, a graduated thimble rotatably mounted on said sleeve with its upper end engaged with said screw head whereby to turn said screw with turning of said thimble, a collar mounted upon said shaft above said screw head and keyed in said longitudinal recesses, said collar being formed with upwardly extending spring tongues adapted to engage said inch spaced recesses and with an annular flange, means combined with said collar to cause the engagement of said spring tongues in an annular recess, anti-friction means for spacing said collar from said screw head, anti-friction means mounted over said collar flange, a bearing nut threaded on said screw head and engaging over said last anti-friction means, and a lock nut threaded on said head to hold the bearing nut rigid thereon.

5. In a measuring instrument, the combination with a shaft provided upon its periphery with equi-spaced longitudinal recesses and inch spaced annular recesses, fixed and movable caliper elements detachably carried by the shaft, a graduated sleeve slidably mounted on said shaft in engagement with the movable caliper element and formed at its upper end with an interiorly threaded portion spaced from said shaft, key means inset in said sleeve and engaged in said longitudinal recesses to prevent rotary movement, a screw rotatably mounted on said shaft with a portion threaded in said interiorly threaded sleeve portion, said screw having an upwardly extending and enlarged head, a graduated thimble rotatably mounted on said sleeve upwardly extending therefrom and frictionally engaged with said screw head, a collar slidably mounted upon the shaft above said screw head, said collar device being formed with upwardly extending spring tongues, means combined with the collar to produce the engagement and disengagement of said tongues with any of said annular recesses, key means inset in said collar and engaged in said longitudinal recesses to prevent rotary movement, and means combined with anti-friction devices for connecting said screw head with said collar whereby said screw may be freely rotated.

In testimony whereof I have signed my name to this specification.

SIMON AUER.